(12) United States Patent
Crawford (10) Patent No.: US 9,477,535 B2
(45) Date of Patent: Oct. 25, 2016

(54) CONNECTION POOL FOR ACCESSING A BACKEND PROCESSING SYSTEM

(71) Applicant: James Crawford, Dublin (IE)

(72) Inventor: James Crawford, Dublin (IE)

(73) Assignee: Business Objects Software Ltd., Dublin (IE)

( * ) Notice: Subject to any disclaimer, the term of this patent is extended or adjusted under 35 U.S.C. 154(b) by 638 days.

(21) Appl. No.: 13/765,529

(22) Filed: Feb. 12, 2013

(65) Prior Publication Data

US 2014/0229525 A1   Aug. 14, 2014

(51) Int. Cl.
| | | |
|---|---|---|
| G06F 15/16 | (2006.01) | |
| G06F 9/54 | (2006.01) | |
| H04L 29/06 | (2006.01) | |
| H04L 29/08 | (2006.01) | |

(52) U.S. Cl.
CPC ............ *G06F 9/54* (2013.01); *H04L 29/06319* (2013.01); *H04L 29/08576* (2013.01); *H04L 67/42* (2013.01); *G06F 2209/5011* (2013.01)

(58) Field of Classification Search
USPC ........................................................ 709/227
See application file for complete search history.

(56) References Cited

U.S. PATENT DOCUMENTS

| | | | |
|---|---|---|---|
| 7,801,967 B1* | 9/2010 | Bedell et al. ................. | 709/217 |
| 8,392,969 B1* | 3/2013 | Park et al. ......................... | 726/4 |
| 2004/0221031 A1* | 11/2004 | Desai ............................. | 709/224 |
| 2004/0255307 A1* | 12/2004 | Irudayaraj ........... | H04L 67/1095 719/328 |
| 2005/0273844 A1* | 12/2005 | Dapkus et al. .................... | 726/9 |
| 2006/0026286 A1* | 2/2006 | Lei ....................... | G06F 12/0875 709/227 |
| 2006/0156023 A1* | 7/2006 | Luo ...................... | G06F 21/6227 713/182 |
| 2008/0228923 A1* | 9/2008 | Chidambaran ......... | H04L 67/14 709/227 |
| 2012/0117247 A1* | 5/2012 | Carruthers .............. | G06F 21/31 709/226 |
| 2015/0134834 A1* | 5/2015 | Galchev ................ | H04L 67/141 709/227 |

OTHER PUBLICATIONS

"BEA WebLogic Server: Configuring and Managing WebLogic JDBC. Version 10.0", (Revised Mar. 30, 2007), 140 pgs.
Waldman, Steve, "c3p0—JDBC3 Connection and Statement Pooling", © 2012 Machinery for Change, Inc., [Online], Retrieved from the Internet: <URL: http://www.mchange.com/projects/c3p0/>, 16 pgs.

* cited by examiner

*Primary Examiner* — Aftab N Khan
(74) *Attorney, Agent, or Firm* — Schwegman Lundberg & Woessner, P.A.

(57) ABSTRACT

Example systems and methods of providing a connection with a backend processing system are presented. In one example, a request for a connection between the backend processing system and a user of an application is received. One of a plurality of connections with the backend processing system is selected. Each of the plurality of connections is bound with a corresponding generic user session in the backend processing system. In response to the request, the selected connection is unbound from a generic user session and bound with a user session corresponding to the user of the application. Access to the selected connection is provided to the user of the application.

20 Claims, 9 Drawing Sheets

CONNECTION POOL FOR ACCESSING A BACKEND PROCESSING SYSTEM

FIELD

This application relates generally to data processing and, in an example embodiment, to connections between user applications and backend processing systems.

BACKGROUND

In many multitier data processing architectures, client or user computing systems may access a backend data processing system (e.g., a database system) by way of an intermediate server or processing system. To access the backend processing system, a user of a client system, by way of an application executing on the client system, may request a communication connection with the backend processing system via the intermediate system, engage in whatever access is necessary with the backend system, and then close the connection until the time that another connection is required. Presuming the backend processing system is a database system, the amount of time consumed by the creation of a connection between the application and the backend processing system may exceed the amount of time used to execute the actual database transaction supported by the connection by a factor of a hundred, a thousand, or more. As a result, system designers have sought to reduce or eliminate unnecessary connection and reconnection operations to streamline the use of backend processing systems.

To that end, connection pools have become an oft-used tool in communicatively coupling a user of a client system with a backend processing system. Generally, a connection pool is a group of connections established between the intermediate system and the backend processing system that are reused multiple times and shared by the users to access the backend processing system, thus greatly reducing unnecessary reconnection operations. To maintain the connections for a connection pool, all of the connections are typically created for a single generic or "technical" user not specifically associated with any of the actual users of the client system. Each of the connections may then be provided to the actual users on an as-needed basis without repeatedly closing and recreating the connections. Such a connection pool is often termed a "homogeneous connection pool," given the use of the single technical user to create and maintain the connections.

As a result of the use of a homogeneous connection pool, the backend processing system is typically aware of only the identity of the technical user, not the actual users of the client systems. Accordingly, without knowing which actual user is currently engaging the backend processing system, support for user authentication, access security for particular datasets, audit trails, and other organizational and governmental functions is complicated. To address this issue, other types of connection pools, such as a "pool-of-pools" (involving the creation of a homogeneous connection pool for each of the actual users) and heterogeneous connection pools (involving the creation of multiple connections, each based on credentials of an actual user), have been employed. However, while these alternative pooling systems may facilitate support for security and auditing functions at the client device or application, other complications often result, such as a lack of sharing of each connection among the actual users, which may in turn cause the creation and teardown of a number of connections well beyond that of a homogeneous connection pool to facilitate concurrent access among the users of the client systems.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
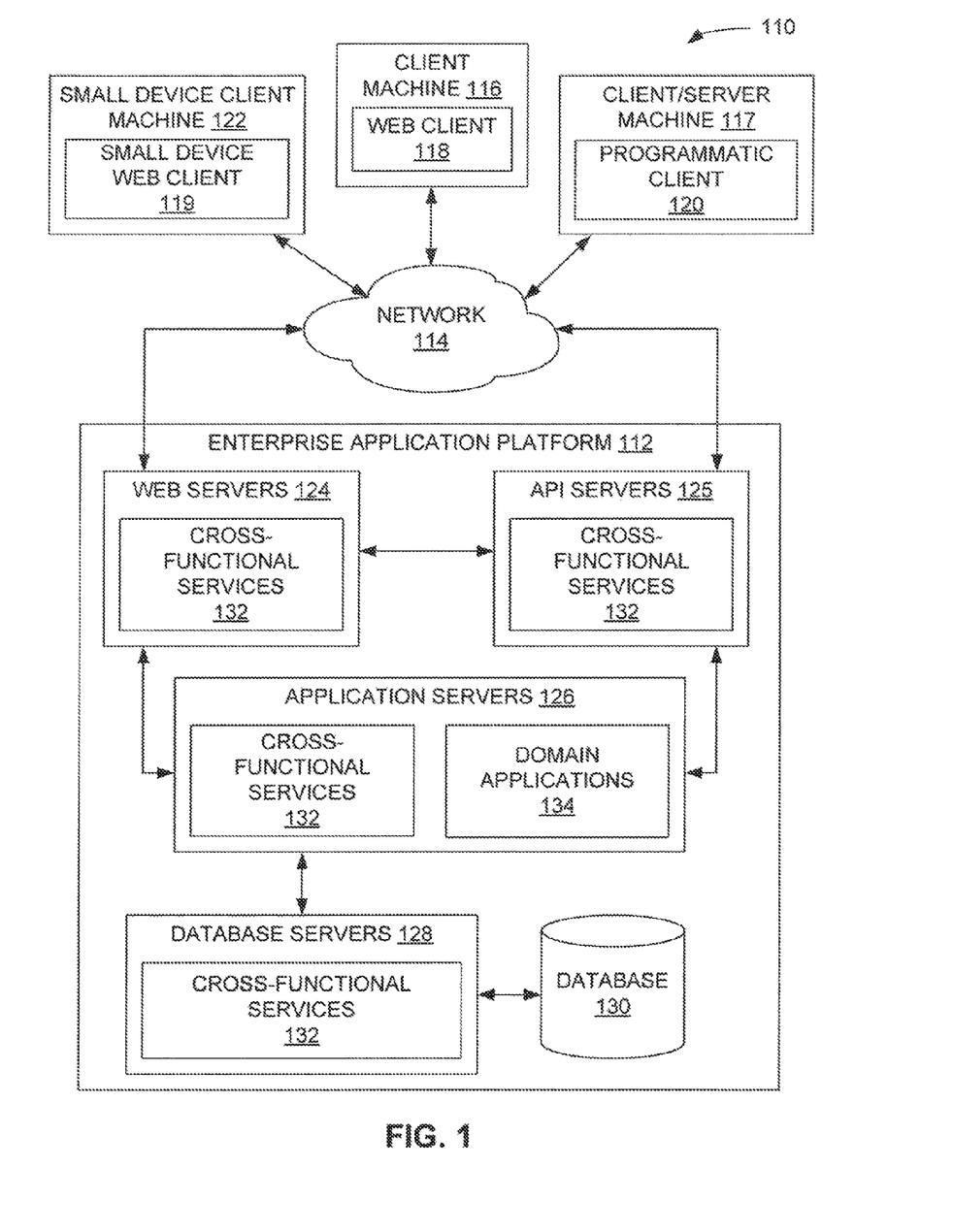
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128, which may facilitate access to one or more databases 130. The web servers 124, API servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
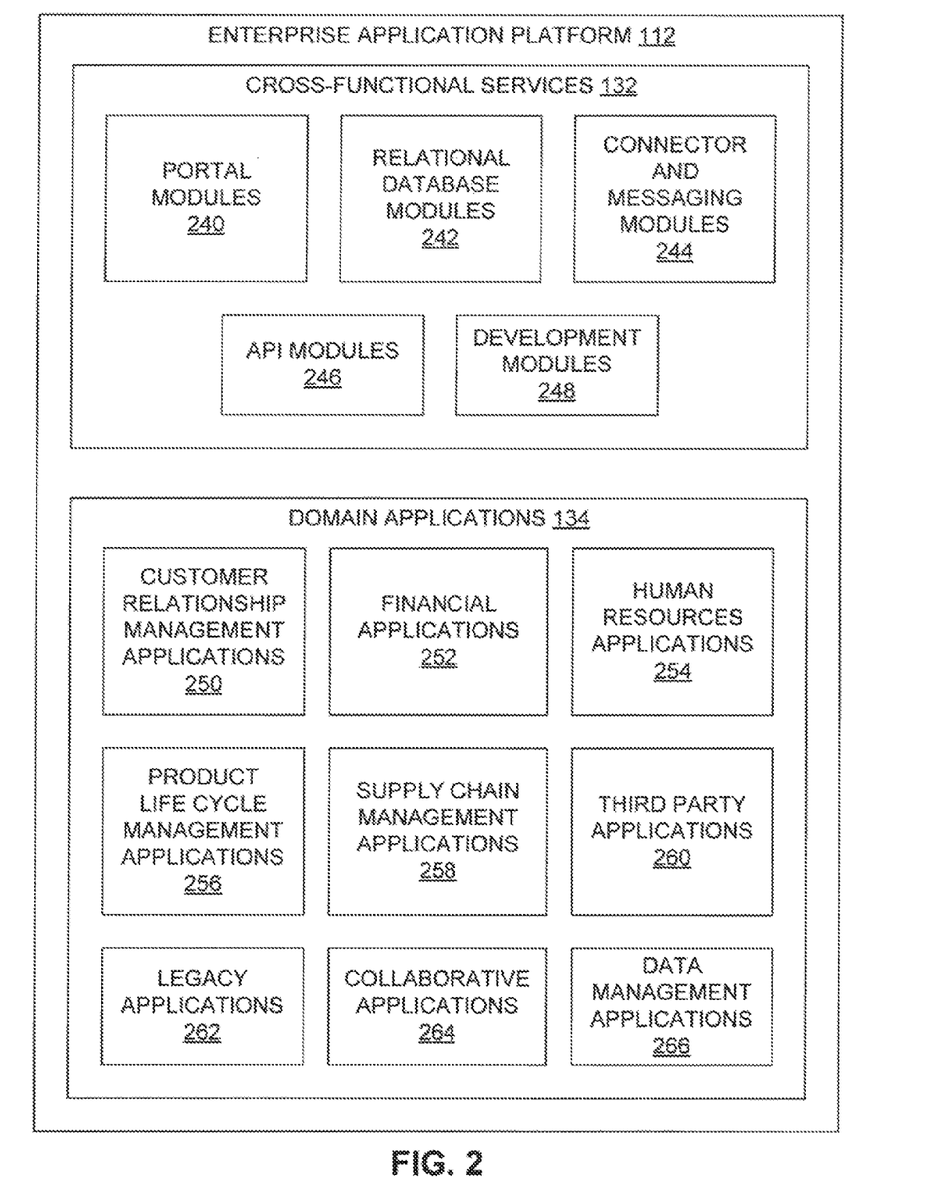
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, API modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java®, Java 2 Platform-Enterprise Edition (J2EE). SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, Structured Query Language (SQL), SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The API modules 246 may enable the development of service-based applications by exposing an interface to existing and new applications as services. Repositories may be included in the platform 112 as a central place to find available services when building applications.

The development modules 248 may provide a development environment for the adding, integrating, updating, and extending of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel who are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the lifecycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
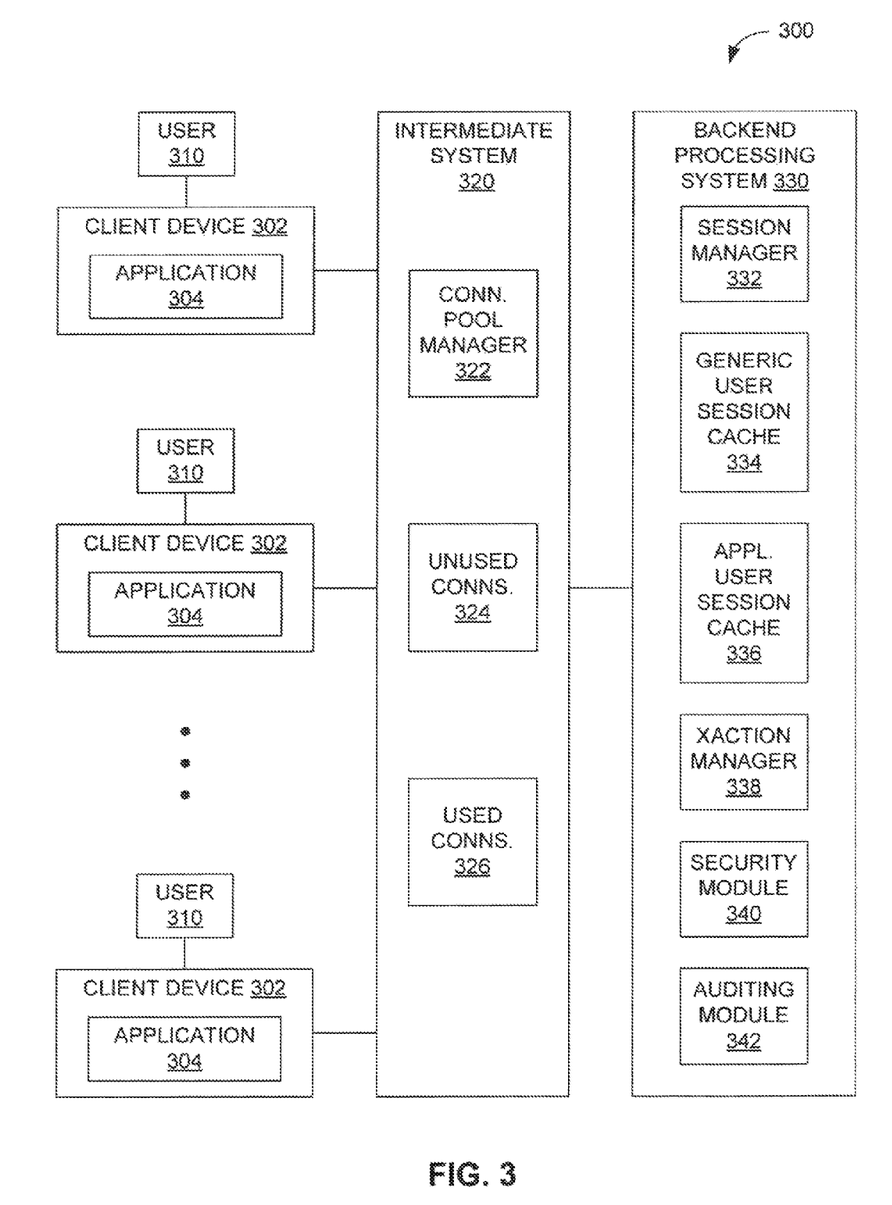
FIG. 3 is a block diagram of an example multitier system in which a connection pool is provided for access to a backend processing system.

FIG. 3 is a block diagram of an example multitier system 300 in which a connection pool is provided for access to a backend processing system 330. In some examples, one or more of the database servers 128 or the database 130 of FIG. 1 may serve as the backend processing system 330. However, any other system that provides a service for a user application via a logical connection may serve as the backend processing system 330 in other implementations. Also, any of the client machine 116, the client/server machine 117, and the small device client machine 122 may serve as one of the client devices 302 depicted in FIG. 3. Each of the client devices 302 may be a personal computer (PC), a laptop computer, a tablet computer, a smart phone, a personal digital assistant (PDA), or any other device configured to interact with the backend processing system 330 via the intermediate system 320. As shown, each of the client devices 302 includes an application 304 to be used by a user 310, with the application 304 engaging in repeated access to the backend processing system 330. In other examples, the application 304 may be executed on a system separate from the client devices 302, such as one or more of the application servers 126 of FIG. 1. Accordingly, the application 304 may be any of the domain applications 134 or cross-functional services 132 described above.

To provide a connection between a user 310 of an application 304 and the backend processing system 330, an intermediate system 320 may maintain a plurality of connections as a connection pool from which each of the users 310 request a connection for access to the backend processing system 330. Presuming the application 304 is executed on one or more of the application servers 126 of FIG. 1, one or more of the database servers 128 may serve as the intermediate system 320 maintaining the connection pool. In another example in which the application 304 is executing on the client device 302, one or more of the web servers 124, the API servers 125, or another system of the enterprise application platform 112 may serve as the intermediate system 320. In yet another implementation, the intermediate system 320 may be incorporated in the database 130 of FIG. 1 or another backend processing system 330.

In the example of FIG. 3, the intermediate system 320 may include a connection pool manager 322, a number of unused connections 324, and a number of used connections 326 currently used by the users 310 to access the backend processing system 330. The connection pool manager 322, for example, may receive requests for connections from the users 310 via the application 304, initiate the assignment or reservation of an unused connection 324 to a user 310, cause a return of a recently used connection 326 to the unused connections 324, and the like. More examples regarding the assignment and return of connections are discussed in detail below.

The backend processing system 330 may include, in one example, a session manager 332, a generic user session cache 334, an application user session cache 336, a transaction manager 338, a security module 340, and/or an auditing module 342. In other implementations, one or more of these modules 332-342 may be combined into fewer modules or subdivided to yield a greater number of modules. Further, at least one of the modules 332-342 may be omitted, and/or additional modules may be included compared to those illustrated in FIG. 3.

In the backend processing system 330, the session manager 332 may control the binding and unbinding of the connections maintained in the intermediate system 320 with user sessions involving both a generic or "technical" user and the users 310 of the application 304 in response to requests received from intermediate system 320 to use and return connections of the connection pool based on activity by the users 310 in using the application 304. In one example, a user session may be an exchange of information or a similar relationship between a user and the backend processing system that lasts some period of time.

To aid the session manager 332 in managing the sessions and their association with the connections of the connection pool, the backend processing system 330 may employ a generic user session cache 334 to maintain generic user sessions that are not currently bound to any of the connections of the connection pool, as well as an application user session cache 336 to maintain user sessions associated with the users 310 of the application 304 that are not currently bound with any of the connections. The possible use of the generic user session cache 334 and the application user session cache 336 is described in greater detail below.

While a user 310 of an application 304 is using a connection to the backend processing system 330, the user may access the backend processing system 330 using one or more transactions, which may include data retrieval from, data storage to, or data exchange between the application 304 and the backend processing system 330. In one example, the transactions may be database transactions, such as row or column read and/or write operations. In the example of FIG. 3, the transaction manager 338 may process such transactions or accesses in the backend processing system 330.

Also, as a result of binding and unbinding the various user sessions with the connections, the session manager 332 may be aware of which user 310 of the application 304 is employing a particular connection. As a result, the backend processing system 330 may provide user access authorization, enforce user permissions for particular datasets, and/or provide auditing functionality, such as what may be required to comply with one or more regulatory or contractual standards. To that end, the backend processing system 330 may include a security module 340 that, for example, may prevent unauthorized users 310, such as those users 310 that have not subscribed to access the backend processing system 330, from accessing the backend processing system 330. In another example, the backend processing system 330 may include an auditing module 342 that may track the use of the backend processing system 330 by each of the users 310. In an embodiment, the use by a user 310 may be measured by a number of transactions between the user 310 and the backend processing system 330, an amount of time during which the user 310 and the backend processing system 330 are connected, or some other metric.

Thus, by employing the multitier system 300 of FIG. 3, a pool of connections may be provided to a number of users 310 of one or more applications 304 in a timely and efficient manner while maintaining the ability to provide security, usage tracking, and other functions that require knowledge of the particular users 310 accessing the backend processing system 330. Other possible aspects of the multitier system 300, as well as other systems and methods described below, are described in the following description.

Figure 4A:
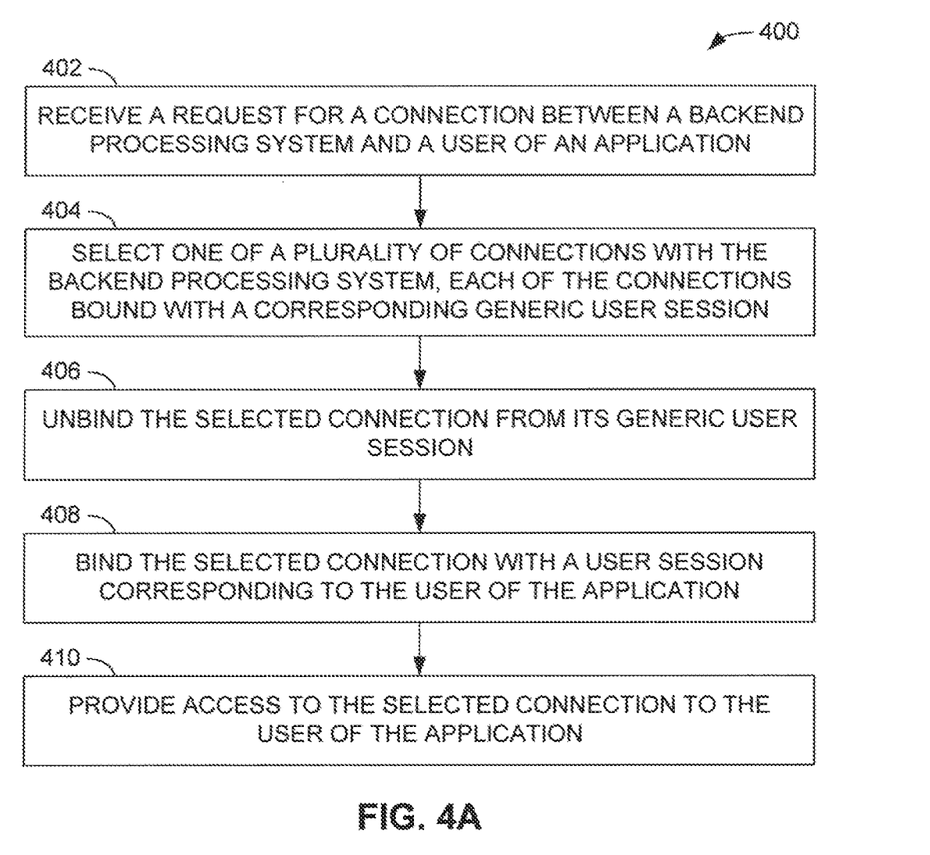
FIG. 4A is a flow diagram illustrating an example method of providing a connection of a connection pool to access a backend processing system.

FIG. 4A is a flow diagram illustrating an example method 400 of providing a connection of a connection pool to access a backend processing system, such as the backend processing system 330 of FIG. 3. While the various operations of the method 400 are described in reference to the backend processing system 330, other devices or systems may be employed to perform the method 400 in other embodiments.

In the method 400, a request for a connection between the backend processing system 330 and a user 310 of an application 304 may be received (operation 402). In one example, the request is received at the backend processing system 330 via the intermediate system 320, which may maintain the available connections in a connection pool, as described above. In response to the request, the backend processing system 330 may select one of the available connections (operation 404). In an example, each of the available connections is bound with a corresponding generic user session in the backend processing system 330. Further, each of the generic user sessions may be associated with a generic or "technical" user (e.g., a user not associated or represented by an actual user 310 of the application 304) associated with the intermediate system 320. As is described in greater detail below, the generic user may be restricted in the types of commands it may issue to the backend processing system 330 compared to the actual users 310.

The backend processing system 330 may then unbind the selected connection from its generic user session (operation 406) and bind the selected connection with a user session corresponding to the user of the application that is associated with the request (operation 408). The backend processing system 330 may then provide the user 310 with the selected connection so that the user 310, via the application 304, may access the backend processing system 330 (operation 410). Further, by binding the connection with the appropriate user session, the backend processing system 330 possesses the ability to monitor which connections are being used by which users 310, thus allowing security, auditing, and similar functions that require knowledge of the particular users 310 that are connected to the backend processing system 330 at any point in time.

In some examples, the generic user sessions and the application user sessions may be maintained in the generic user session cache 334 and the application user session cache 336, respectively, in the environment of FIG. 3. Maintaining these caches may allow the reuse of the user sessions in the backend processing system 330 while the sessions are not bound to a connection of the connection pool.

While the operations 402 through 410 of the method 400 of FIG. 4A are shown in a specific order, other orders of operation, including possibly concurrent or continual execution of at least portions of one or more operations, may be possible in some implementations of method 400, as well as other methods discussed herein. For example, the unbinding and binding of the selected communication connection (operations 406 and 408) may occur substantially concurrently or simultaneously in some embodiments.

Figure 4B:
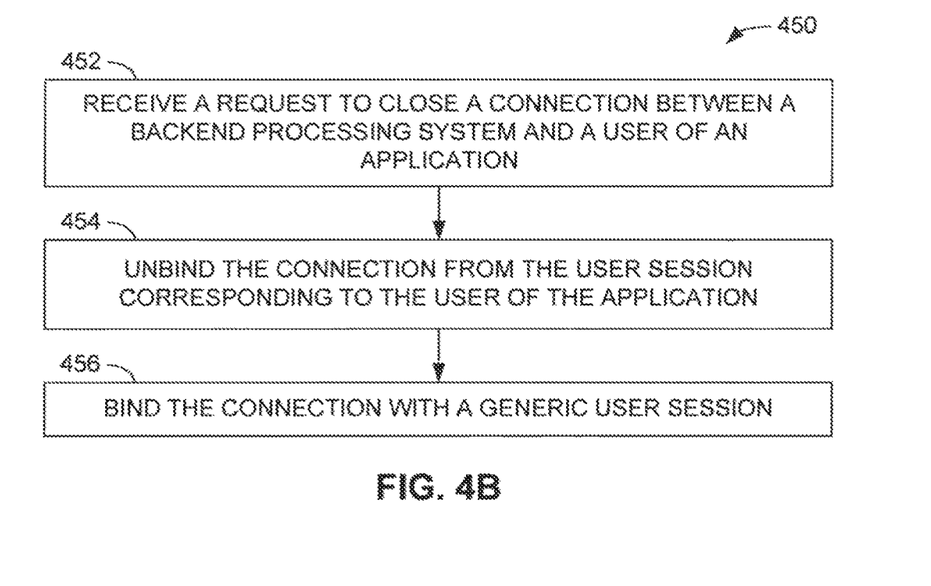
FIG. 4B is a flow diagram illustrating an example method of returning a used connection to a connection pool.

FIG. 4B is a flow diagram illustrating an example method 450 of returning a used connection to the connection pool. More specifically, a user 310 of an application 304, after using a connection to access the backend processing system 330, may return the connection to the connection pool if the application 304 does not anticipate needing the connection to access the backend processing system 330 within some ensuing time period. In that case, the backend processing system 330 may receive a request to close the connection between the backend processing system 330 and the user 310 that has been using the connection via the application 304 (operation 452). In response to the request, the backend processing system 330 may unbind the connection from the user session corresponding to user 310 of the application 304 (operation 454) and bind the connection with a generic user session (operation 456), thus effectively returning the connection to the connection pool, thereby making the connection available for subsequent use by any of the users 310 using the one or more applications 304. Similar to operations of the method 400 of FIG. 4A, multiple operations, such as the unbinding and binding of the connection (operations 454 and 456, respectively), may be performed substantially simultaneously or concurrently.

Figure 5:
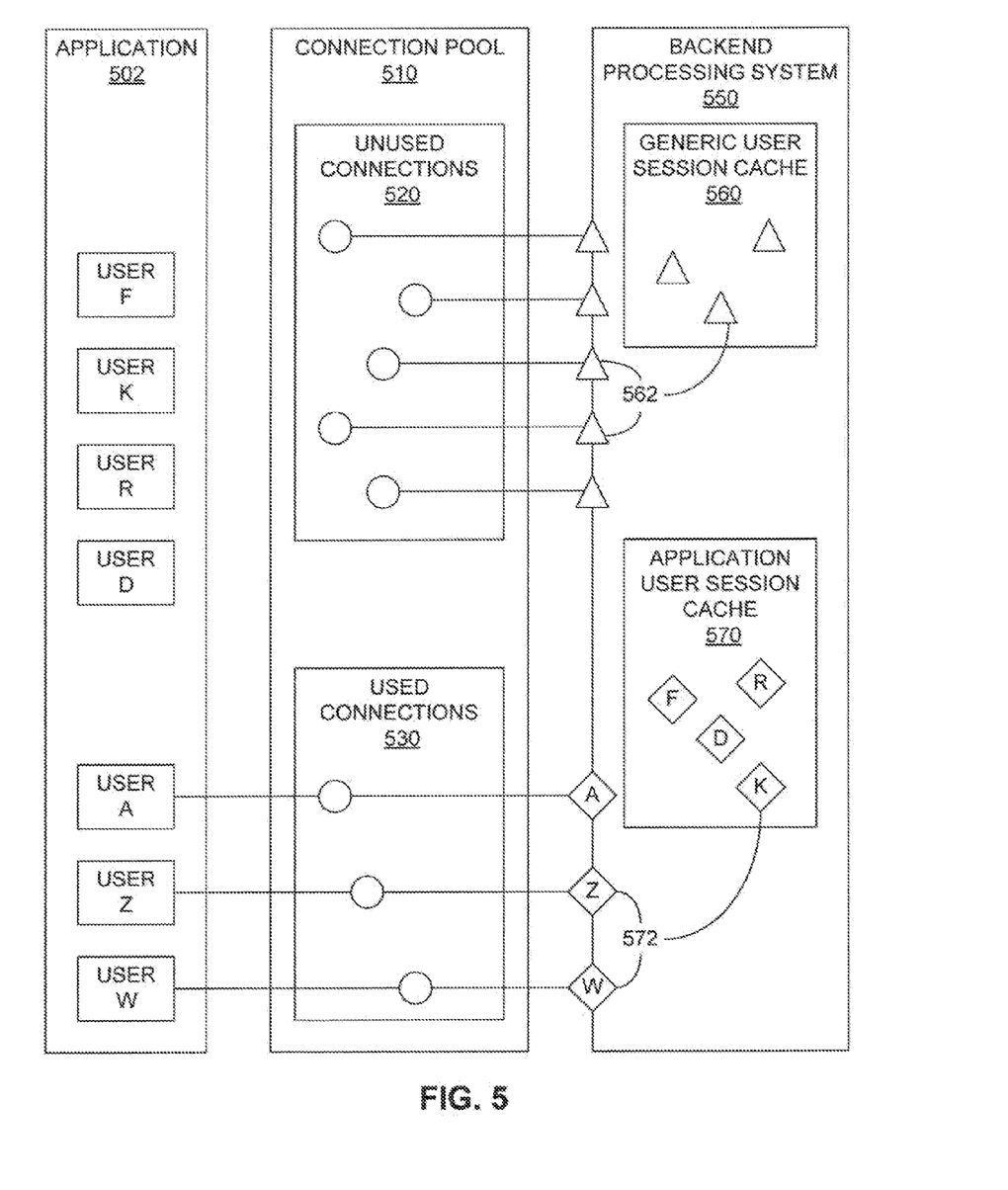
FIG. 5 is a block diagram of another example multitier system in which a connection pool is provided for access to a backend processing system.

FIG. 5 is a block diagram of another example multitier system 500 in which a connection pool 510 is provided for access to a backend processing system 550. As shown, the connection pool 510 may be implemented in an intermediate system (e.g., intermediate system 320 of FIG. 3) between one or more systems executing one or more applications 502 and the backend processing system 550. In another example, the connection pool 510 may be implemented within the backend processing system 550.

The application 502 may be employed by a number of users, labeled in FIG. 5 as User F, User K, User R, User D, User A, User Z, and User W, in no particular order. As indicated in one example above, the application 502 may be executed on a client device associated with each user, or may be executed on an application server or similar system, whereby the client devices of the users may access the application 502 via a network connection or other communication means.

The connection pool 510, as depicted in FIG. 5, may include, at any particular point in time, zero or more unused connections 520 and zero or more used connections 530. At the particular point in time depicted in FIG. 5, a total of eight connections exist: five unused connections 520 and three used connections 530. To maintain each of the connections, each connection is bound with a user session. The three used connections 530 are being employed by Users A, Z, and W to access the backend processing system 550, and are bound with their respective application user sessions 572 in the backend processing system 550.

The five unused connections 520 are each bound with a generic user session 562 in the backend processing system 550. Unlike the application user sessions 572, each generic user session 562 is associated with a generic or technical user that does not represent any of the actual users of the application 502. Instead, in one example, the generic user is associated with the connection pool 510 (or the intermediate system 320 of FIG. 3) primarily for the purpose of maintaining a connection that is not currently used by one of the users of the application 502. In some implementations, the amount of access or control the generic user possesses over the backend processing system 550 is limited. For example, the generic user may only possess the permissions necessary to connect to the backend processing system 550 and perform connection-level operations therewith. The generic user may be prohibited from initiating operations such as reading, writing, or exchanging of user or application data in the backend processing system 550.

In one example, both the generic user sessions 562 and the application user sessions 572 may be generated as their need arises in the backend processing system 550. For example, when the connections of the connection pool are first generated, the backend processing system 550 may generate enough generic user sessions 562 to be bound with each of the available connections to be provided. In the specific example of FIG. 5, a total of eight generic user sessions 562 have been created: five that are bound with unused connections 520, and three that are available in the generic user session cache 560 to be bound with the three used connections 530 that are currently bound with the application user sessions 572 for Users A, Z, and W.

Regarding the application user sessions 572, the backend processing system 550 may generate an application user session 572 for a particular application user when a request is received for a connection between that user and the backend processing system 550. When the requested connection is then closed or relinquished by that user, the associated application user session 572 may then be unbound from the connection and maintained in the application user session cache 570 until that user again requests a connection. As shown in FIG. 5, each of the users of the application 502 may have requested a connection to the backend processing system 550 at least once, as an application user session 572 has been created for each of Users F, K, R, D, A, Z, and W, with the application user sessions 572 for Users A, Z, and W currently bound to one of the used connections 530, and with the application user sessions 572 for Users F, K, R, and D being retained in the application user session cache 570 since none of their associated users is currently employing a connection from the connection pool 510. In some implementations, more than one application user session 572 may exist for each application user, such as in environments in which multiple connections may expedite the processing of transactions between the user and the backend processing system 550. In one example, either or both of the generic user session cache 560 and the application user session cache 570 may be created upon initial startup of the backend processing system 550 or the connection pool 510.

Figure 6A:
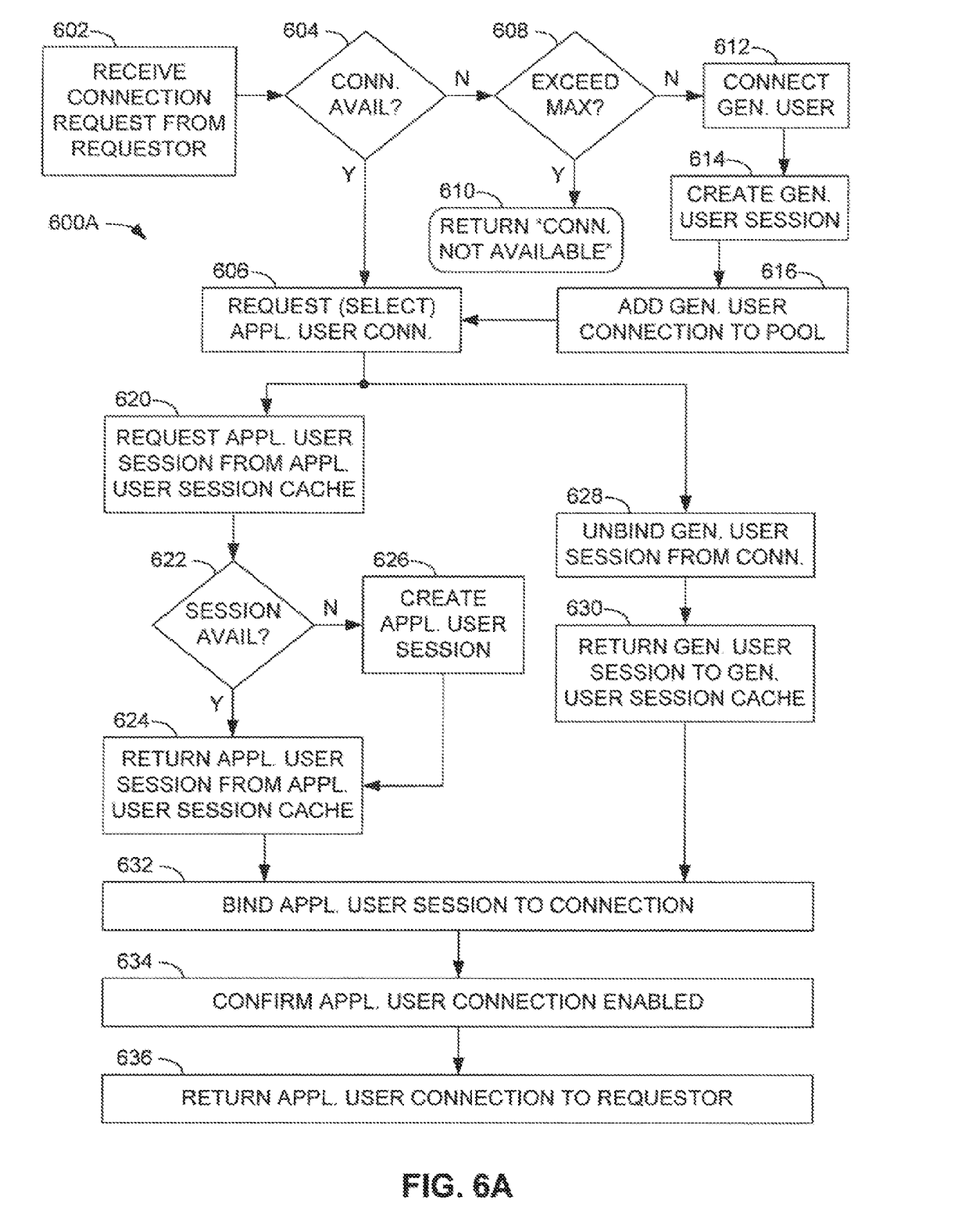
FIG. 6A is a flow diagram illustrating another example method of providing a connection of a connection pool to access a backend processing system.
Figure 6B:
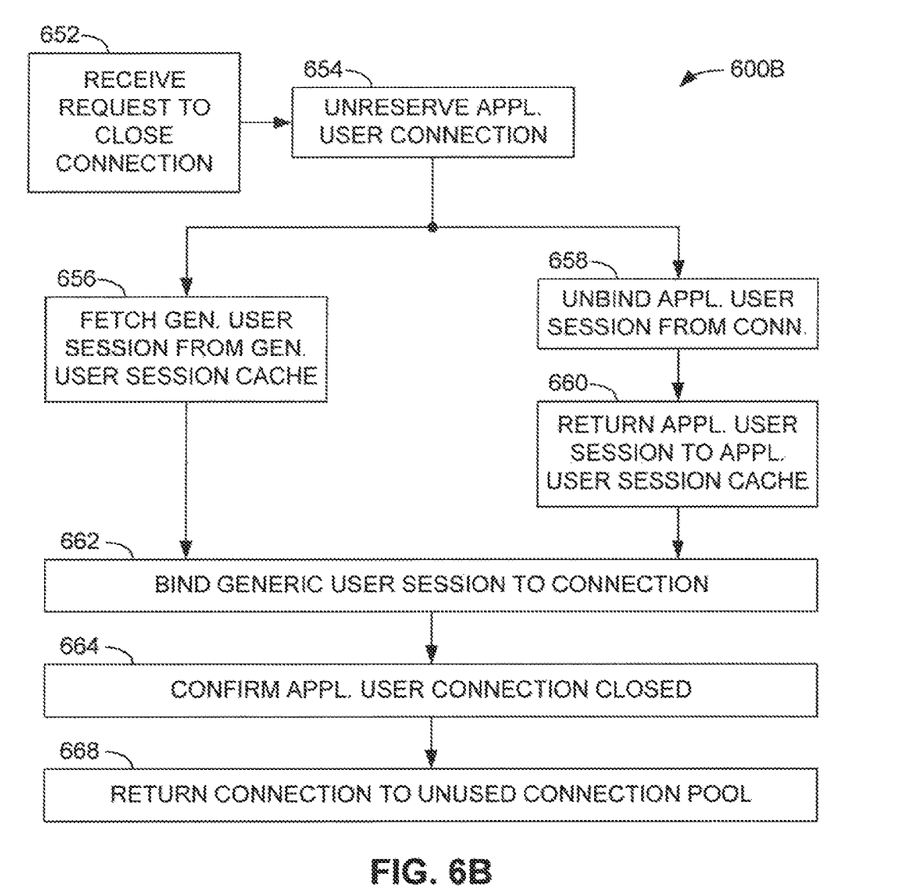
FIG. 6B is a flow diagram illustrating another example method of returning a used connection to a connection pool.

FIG. 6A is a flow diagram illustrating another example method 600A of providing a connection of a connection pool to access a backend processing system. In the following examples, the methods 600A, 600B of FIGS. 6A and 6B are described relative to the multitier system 500 of FIG. 5. However, other systems not specifically described herein may be employed to perform these methods 600A, 600B in other examples.

In the method 600A, a connection request may be received at the connection pool 510 from a requestor (operation 602). For example, the application 502, in response to being employed by a user, may request the connection pool 510 for an unused connection 520 to access the backend processing system 550. Such a request may include identifying information, such as user credentials, for the application user requesting access. In response, the connection pool 510 may determine whether an unused connection 520 is available for use by the application user (operation 604). If so, the connection pool 510 may request the backend processing system 550 to select an unused connection 520 for use by the application user (operation 606). In one implementation, this request may also contain user credentials or other identifying information associated with the application user. In some examples, the backend processing system 550 may determine whether the application user is authorized to access the backend processing system 550 via a security module (e.g., the security module 340 of FIG. 3) before proceeding with making a connection ready for use by the application user.

If, instead, the connection pool 510 determines that an unused connection 520 is not currently available for the requesting application user, the connection pool 510 may determine whether a maximum number of connections already exist in the connection pool 510 (operation 608). If so, the connection pool 510 may return a response to the requestor of the connection indicating that an unused connection 520 is not available (operation 610). Otherwise, the connection pool 510 may establish a new connection between the generic user and the backend processing system 550 (operation 612). In response to the creation of this connection, the backend processing system 550 may create a new generic user session 562 (operation 614) and bind the generic user session 562 to the newly created connection. The connection pool 510 may then include the newly created connection in the connection pool 510 as an unused connection 520 (operation 616). With an unused connection 520 available, the connection pool 510 may then request the backend processing system 550 to select the unused connection 520 for use by the application user (operation 606), and possibly include the credentials or other identifying information for the application user, as indicated above.

In response to the request for the unused connection 520, the backend processing system 550 may request an application user session 572 associated with the requesting user from the application user session cache 570 (operation 620). If such a session is available (operation 622), the application user session cache 570 may return the application user session 572 associated with the requesting user (operation 624) to the backend processing system 550. Otherwise, the backend processing system 550 may create an application user session 572 for the requesting user (operation 626), possibly using that user's credentials, in the application user session cache 570. The created application user session 572 may then be returned from the application user session cache 570 to the backend processing system 550 (operation 624). Concurrently with any or all of the operations 620-626 described above, or at another time, the backend processing system 550 also may unbind the generic user session 562 currently bound with the selected unused connection 520 (operation 628) and return that generic user session 562 to the generic user session cache 560 (operation 630).

The backend processing system 550 may then bind the application user session 572 to the selected connection (operation 632). In some examples, the backend processing system 550 may confirm that the connection is enabled (operation 634) and indicate that fact to the connection pool 510. The connection pool 510 may then, in turn, return the connection to the requestor (operation 636) (e.g., the application 502 associated with the user that is to use the connection). The connection is then ready for use as a used connection 530 by the user via the application 502 to access the backend processing system 550. In one example, the backend processing system 550 may monitor this access by the user to collect information regarding that use for regulatory, contractual, and other purposes.

FIG. 6B is a flow diagram illustrating another example method 600B of returning a used connection 530 to the connection pool 510. More specifically, the connection pool 510 may be receive a request from an application 502, or a user of that application 502, to return or close the used connection 530 associated with that particular user (operation 652). In response, the connection pool 510 may unreserve the used connection 530 being employed by that user (operation 654) via a request to the backend processing system 550. In response, the backend processing system 550 may fetch or retrieve a generic user session 562 from the generic user session cache 560 (operation 656). Concurrently with the retrieval of the generic user session (operation 656), or at some other time, the backend processing system 550 may also unbind the application user session 572 of the requesting user from the used connection 530 (operation 658) and return the application user session 572 to the application user session cache 570 (operation 660).

Thereafter, the backend processing system 550 may bind the generic user session 562 to the connection (operation 662), and possibly confirm to the connection pool 510 that that the used connection 530 is now unused or closed (operation 664). In response, the connection pool 510 may then return the connection to the connection pool 510 as an unused connection 520 (operation 668), which now renders the unused connection 520 available for use by the same user or another user of the application 502.

As a result of at least some of the embodiments described above, a connection pool may be created that efficiently and rapidly makes multiple connections to a backend processing system available for multiple application users without the creation of more connections than are needed to serve the application users. Further, the backend processing system, as a result of receiving user credentials or other identifying information, may implement data access authorization and security, audit-based logging, and other functions of importance to users and governmental entities alike. In addition, implementing such functions in the backend processing systems is likely to be more efficient than distributing this functionality across all client devices of users attempting to access the backend processing system. Further, the use of the generic user sessions may allow the backend processing system to limit the load on that system by restricting the number of connections available without creating and closing the connections repeatedly in response to requests for access to the system.

Figure 7:
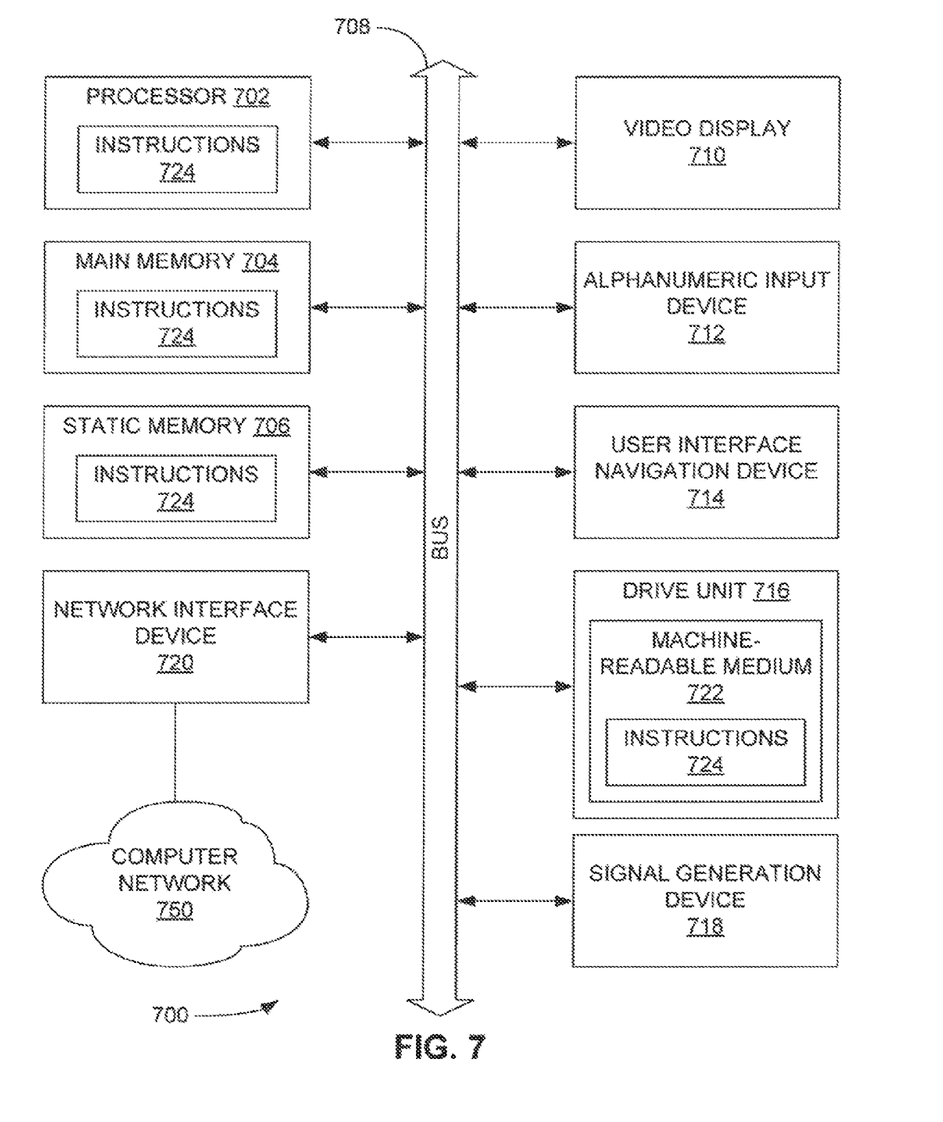
FIG. 7 is a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions 724 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD), or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of providing a connection with a backend processing system, the method comprising:
   receiving, from an application, a request for a connection between the backend processing system and a user of the application;
   selecting one of a plurality of connections with the backend processing system, each of the plurality of connections bound with a corresponding generic user session in the backend processing system;
   unbinding, at the backend processing system, in response to receiving the request, the one of the plurality of connections from a generic user session bound with the one of the plurality of connections;
   binding, at the backend processing system, a user session corresponding to the user of the application with the one of the plurality of connections;
   returning, after the unbinding of the generic user session from the one of the plurality of connections, the generic user session to a generic user session cache, in the backend processing system, that stores a number of generic user sessions equal to the number of bound user sessions; and
   providing, to the user of the application, in response to the binding of the user session corresponding to the user of the application, access to the one of the plurality of connections.

2. The method of claim 1, further comprising:
   determining whether a user session corresponding to the user of the application exists; and
   creating, in response to a determination that a user session corresponding to the user of the application does not exist, the user session corresponding to the user of the application.

3. The method of claim 1, further comprising: retrieving, prior to the binding of the user session corresponding to the user of the application with the one of the plurality of connections, the user session corresponding to the user of the application from a user session cache in the backend processing system.

4. The method of claim 1, further comprising:
   receiving, from the application, a second request for a second connection between the backend processing system and the user of the application;
   unbinding, at the backend processing system, in response to receiving the second request, a second one of the plurality of connections from a second generic user session bound with the second one of the plurality of connections;
   binding, at the backend processing system, a second user session corresponding to the user of the application with the second one of the plurality of connections; and
   providing, to the user of the application, in response to the binding of the second user session corresponding to the user of the application, access to the second one of the plurality of connections.

5. The method of claim 1, further comprising:
   receiving, from the application, a second request for a second connection between the backend processing system and a second user of the application;
   unbinding, at the backend processing system, in response to receiving the second request, a second one of the plurality of connections from a second generic user session bound with the second one of the plurality of connections;
   binding, at the backend processing system, a second user session corresponding to the second user of the application with the second one of the plurality of connections; and
   providing, to the second user of the application, in response to the binding of the second user session corresponding to the second user of the application, access to the second one of the plurality of connections.

6. The method of claim 1, further comprising:
   determining, in response to receiving the request, whether the user of the application has been granted access to the backend processing system; and
   returning, in response to determining that the user of the application has not been granted access to the backend processing system, an indication to the user that a connection is unavailable.

7. The method of claim 1, further comprising: tracking, at the backend processing system, usage of the backend processing system over the one of the plurality of connections by the user of the application.

8. The method of claim 1, further comprising:
determining, in response to receiving the request, whether one of the plurality of connections is currently bound with a generic user session;
the unbinding of the one of the plurality of connections being in response to determining that the one of the plurality of connections is bound with a generic user session.

9. The method of claim 8, further comprising:
determining, based on a determination that none of the plurality of connections are currently bound with a generic user session, whether a maximum number of connections exists; and
returning, based on determining that the maximum number of connections exists, to the user of the application, in response to the request, an indication that a connection is unavailable.

10. The method of claim 9, further comprising:
creating, based on determining that the maximum number of connections does not exist, an additional connection with the backend processing system;
creating an additional generic user session; and
binding the additional connection to the additional generic user session.

11. The method of claim 1, further comprising:
receiving, from the application, a second request to close the one of the plurality of connections between the backend processing system and the user of the application;
unbinding, at the backend processing system, in response to receiving the second request, the one of the plurality of connections from the user session corresponding to the user of the application; and
binding, at the backend processing system, a generic user session from the generic user session cache with the one of the plurality of connections.

12. The method of claim 11, further comprising:
returning, after the unbinding of the one of the plurality of connections from the user session corresponding to the user of the application, the user session corresponding to the user of the application to a user session cache in the backend processing system; and
retrieving, prior to the binding of the generic user session with the one of the plurality of connections, the generic user session from the generic user session cache in the backend processing system.

13. A backend processing system comprising:
at least one processor; and
memory comprising instructions that, when executed by the at least one processor, cause the at least one processor to perform operations comprising:
receiving, from an application, a request for a connection between the backend processing system and a user of the application;
selecting one of a plurality of connections with the backend processing system, each of the plurality of connections bound with a corresponding generic user session in the backend processing system;
unbinding, in response to receiving the request, one of the plurality of connections from a generic user session bound with the one of the plurality of connections;
binding a user session corresponding to the user of the application with the one of the plurality of connections;
returning, after the unbinding of the generic user session from the one of the plurality of connections, the generic user session to a generic user session cache, in the backend processing system, that stores a number of generic user sessions equal to the number of bound user sessions; and
providing, to the user of the application, in response to the binding of the user session corresponding to the user of the application, access to the one of the plurality of connections.

14. The backend processing system of claim 13, the operations further comprising: retrieving, prior to the binding of the user session corresponding to the user of the application with the one of the plurality of connections, the user session corresponding to the user of the application from a user session cache in the backend processing system.

15. The backend processing system of claim 13, the operations further comprising at least one of:
determining, in response to receiving the request, whether the user of the application has been granted access to the backend processing system; and
tracking usage of the backend processing system over the one of the plurality of connections by the user of the application.

16. The backend processing system of claim 13, the backend processing system comprising a database system.

17. The backend processing system of claim 13, the operations further comprising:
receiving, from the application, a second request to close the one of the plurality of connections between the backend processing system and the user of the application;
unbinding, in response to receiving the second request, the one of the plurality of connections from the user session corresponding to the user of the application; and
binding a generic user session with the one of the plurality of connections.

18. The backend processing system of claim 17, the operations further comprising:
returning, after the unbinding of the one of the plurality of connections from the user session corresponding to the user of the application, the user session corresponding to the user of the application to a user session cache in the backend processing system; and
retrieving, prior to the binding of the generic user session with the one of the plurality of connections, the generic user session from the generic user session cache in the backend processing system.

19. A non-transitory computer-readable storage medium comprising instructions that, when executed by at least one processor of a machine, cause the machine to perform operations comprising:
maintaining a plurality of unused connections, each of the plurality of unused connections bound with a generic user session in a backend processing system;
maintaining a plurality of used connections, each of the plurality of used connections employed by a user of an application to access the backend processing system, each of the plurality of used connections bound with a user session in the backend processing system, the user session of an associated used connection corresponding to the user of the application accessing the backend processing system via the associated used connection; and supplying a generic user session cache, in the backend processing system, comprising generic user sessions available for binding with an unused connection, the generic user session cache comprising a number of generic user sessions equal to the number of bound user sessions.

20. The computer-readable storage medium of claim 19, the operations further comprising: supplying a user session cache in the backend processing system, the user session cache comprising at least one user session associated with a first user of the application, at least one user session available for binding with a used connection to facilitate access to the backend processing system by the first user of the application.

\* \* \* \* \*